United States Patent Office 2,776,820
Patented Jan. 8, 1957

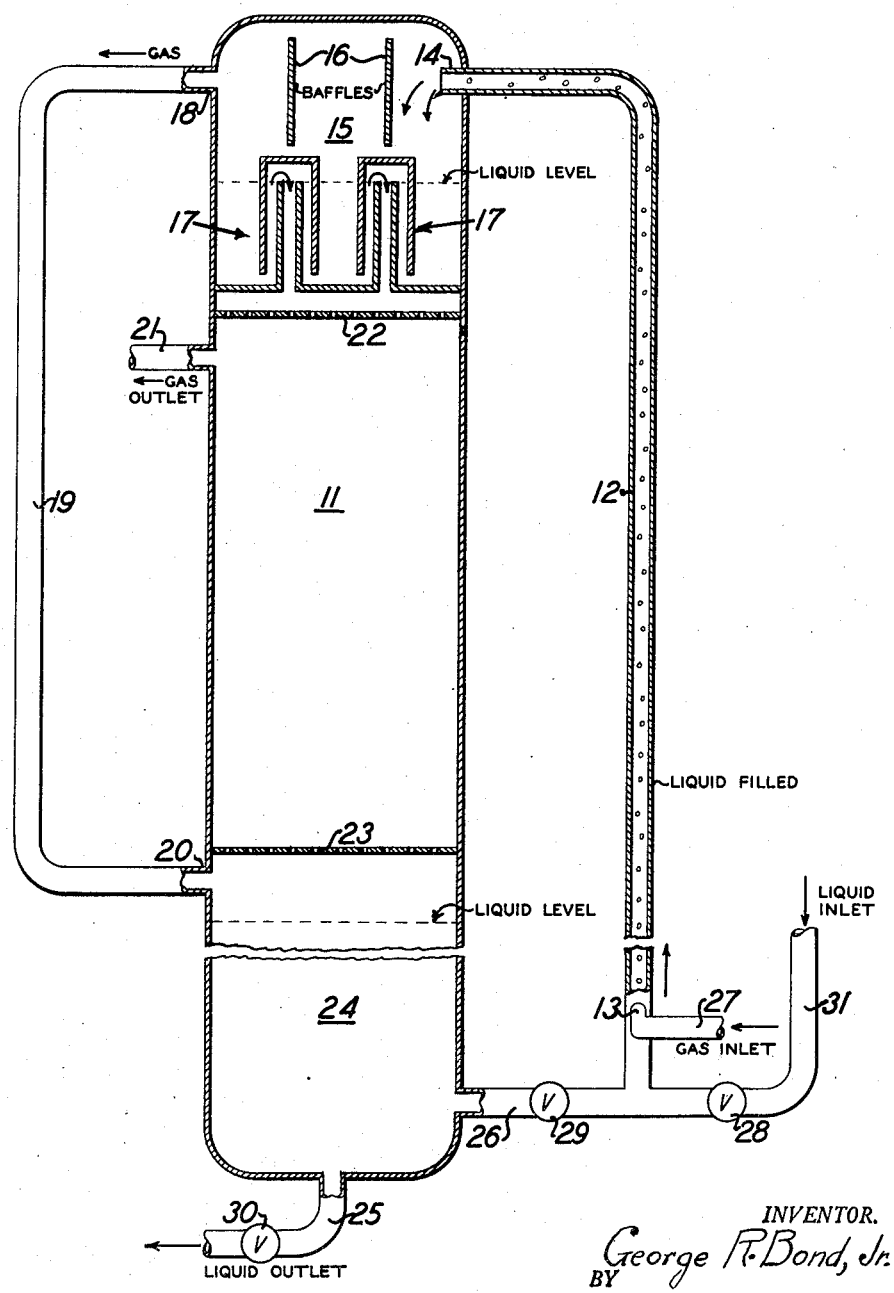

2,776,820

GAS-LIQUID CONTACTING SYSTEM

George R. Bond, Jr., Paulsboro, N. J., assignor to Houdry Process Corporation, Wilmington, Del., a corporation of Delaware Application January 2, 1952, Serial No. 264,409

1 Claim. (Cl. 261—21)

This invention relates generally to gas and liquid contact systems and more specifically to improved apparatus for effecting concurrent and countercurrent gas and liquid contact, preferably in a continuous system.

Gas and liquid contact systems are widely used in various industrial processes for the separation of gaseous components by absorption, for stripping lighter components from rich absorbents, for effecting a variety of chemical reactions between gases and liquids and for effecting heat exchange between gases and liquids. In many such systems, large volumes of liquid must be circulated in order to obtain the desired contact, resulting in high pumping costs. In other such systems tall contacting chambers are required, necessitating the use of expensive pumping equipment required to pump the liquid to the necessary height. Further, the contacting operations are often required to be carried out under pressure in order to make such operations economically practical. High pressure operations require specially designed equipment, adding to the initial cost and maintenance charges.

The present invention is directed to apparatus for effecting gas and liquid contact whereby more efficient contact is obtained and the cost of equipment, maintenance and operation is materially reduced.

In accordance with the present invention, apparatus for contacting gases and liquids is provided wherein the gas to be contacted is used in lieu of conventional pumps to circulate the contacting liquid. This is accomplished in a preferred embodiment of the invention by employing a gas lift pump to elevate the contacting liquid to the top of a countercurrent contact chamber, the contacting gas being used to operate the gas lift pump.

The gas lift column also serves as a countercurrent contact chamber for the gas and liquid.

The gas is then separated from the liquid and introduced at the bottom of a countercurrent contact chamber while the separated liquid is introduced at the top of such contact chamber. The contacted gas is removed at the top of the contact chamber and the contacted liquid drawn off at the bottom thereof. Thus, concurrent contacting takes place within the gas lift pump and thereafter the gas and liquid are subjected to countercurrent contact.

The concurrent contact which takes place with the gas lift pump increases the overall contact efficiency of a given contact chamber. Moreover, the necessity for pumps for circulating the contacting liquid is eliminated, resulting in substantial savings in the initial equipment costs as well as in the costs of operation and maintenance.

In order to further describe the apparatus of the present invention reference is had to the drawing showing a preferred embodiment of the apparatus.

A countercurrent contact chamber is indicated generally at 11. The chamber may be an open spray chamber or it may be provided with conventional means for increasing the area of gas and liquid contact such as baffle plates, bubble-cap plates and the like or be packed with coke, berl saddles and the like as is well known in the art of gas and liquid contact apparatus. A gas lift pipe is indicated at 12 having a gas jet 13 positioned near the bottom thereof. The gas lift pipe 12 terminates at 14 within a gas and liquid separating chamber indicated generally at 15.

Separating chamber 15 is provided with suitable baffles as at 16 to prevent entrainment of liquid in the gas. The separating chamber 15 is further provided with suitable traps as shown at 17 to prevent the flow of gas downwardly into the contact chamber 11. A conduit 19 is connected to the separating chamber 15 as at 18 and extends to a point near the bottom of contact chamber 11 as indicated at 20.

The chamber 11 is provided with a perforated distributing plate 22 near the upper portion thereof to distribute liquid uniformly over the area thereof. The gas outlet pipe from the contact chamber is shown at 21. A second perforated plate 23 may be provided to support packing material (not shown) if it is desirable to employ a packed contact column.

A liquid collecting chamber indicated generally at 24 is positioned beneath the contact chamber 11 and is suitably provided with a liquid outlet pipe 25. The liquid collecting chamber 24 may additionally be provided with a recirculating pipe 26 connecting said collecting chamber with the gas lift pipe 12 to permit recirculation of the liquid. The liquid inlet to the gas lift tube 12 is indicated at 31 and the gas inlet is indicated at 27. The liquid inlet pipe may be provided with a valve 28 and the recirculating pipe 26 and liquid outlet 25 are provided with valves 29 and 30, respectively.

In a preferred method for effecting gas and liquid contact by means of the apparatus described above, valve 29 is closed to prevent recirculation of the liquid and valves 28 and 30 opened to permit flow. Liquid then enters at 31 to a level above that of the gas jet 13. Contacting gas under sufficient pressure to overcome the liquid beads involved is then admitted at 27. The gas bubbles issuing from gas jet 13 carry the liquid up the pipe 12 and the gas and liquid enter the separating chamber 15 at the inlet 14. The liquid falls to the bottom of the separating chamber 15. Baffles 16 remove entrained liquid from the gas and the separated gas then passes out of the separating chamber at 18, passes downwardly through pipe 19 and enters the bottom of the countercurrent contact chamber 11 at 20.

When sufficient liquid has collected in separating chamber 15, it passes through the traps 17 and onto the perforated distributing plate 22. It then passes through the distributing plate 22 in finely divided streams and downwardly into contact chamber 11 where it meets the upwardly flowing gas to effect countercurrent contacting. The contacted gas flows out of the contact chamber through gas outlet 21 and the liquid passes through the liquid collecting chamber 24 and out through liquid outlet 25. The liquid may then be suitably regenerated, in the case of employing the system for gas absorption, and the regenerated liquid returned to the system at 31.

In many contacting operations it is desirable to recirculate the contacting liquid without regeneration or other treatment. In such instances, valves 28 and 30 are closed and valve 29 opened to permit recirculation. Contacting operations involving chemical reactions between gases and liquids, for example, are often advantageously conducted using a recirculation operation. Heavier reaction products may be collected in the bottom of collecting chamber 24 and drawn off through outlet 25 from time to time while the lighter unreacted components are recirculated through pipe 26 to the gas lift pipe 12, meanwhile apportioning fresh liquid through line 31.

In still other contacting operations, it may be desirable to recirculate a portion only of the contacting liquid. In such cases, valves 28, 29 and 30 are opened sufficiently to permit the desired recirculation, introduction of fresh contacting liquid and withdrawal of contacted liquid.

While the present invention has been described and illustrated in its preferred embodiments, it is to be understood that these are by way of example only and various changes and modifications may be made. Thus the type and form of the apparatus may conform to needs of the operation observing only that in addition to the requirements hereinbefore described the operation requires that the downward pressure of the gas-liquid mixture in the equivalent of line 12 at the point of gas introduction must be less than the downward pressure of the related liquid body as indicated at 24 at the same level; and that the pressure conditions within the separation chamber of the type indicated at 15 must be such that the disengaged gas flows therefrom through the prescribed vent, as at 18, without flowing through the liquid outlet lines as at 17.

Obviously many modifications and variations of the invention as hereinbefore set forth may be made without departing from the spirit and scope thereof and therefore only such limitations should be imposed as are indicated in the appended claim.

I claim:

An apparatus for contacting gas and liquid comprising a countercurrent treating chamber having a relatively large cross-sectional area; an upper liquid reservoir feeding liquid to the upper part of the countercurrent treating chamber; a lower liquid reservoir below the countercurrent treating chamber; means for introducing a gas above the liquid level of the lower liquid reservoir in such a manner that said gas moves upwardly through the countercurrent treating chamber for contact with gravitating liquid; a gas outlet for the withdrawal of contacted gas at the upper portion of the countercurrent chamber; a substantially unobstructed lift pipe having a cross-sectional area only a small fraction of the cross-sectional area of the countercurrent treating chamber; means connecting the lower portion of the lift pipe with the lower liquid reservoir; a gas jet at the lower portion of the lift pipe whereby the incoming high pressure gas continuously lifts liquid from the lower to the upper portion of said lift pipe; a separating chamber associated with the upper discharge of the lift pipe; a gas exit in the separating chamber; a conduit transmitting the gas from the gas exit of the separating chamber to the means for introducing gas into the lower portion of the countercurrent treating chamber; baffles in the separating chamber to prevent significant entrainment of liquid in the gas leaving through said gas exit; and traps tending to prevent gas in the separating chamber from leaving the separating chamber through the upper liquid reservoir.

References Cited in the file of this patent

UNITED STATES PATENTS

| 607,417 | Bailey | July 19, 1898 |
| 771,406 | Willett | Oct. 4, 1904 |
| 1,319,274 | Foster | Oct. 21, 1919 |
| 1,703,747 | Patart | Feb. 26, 1929 |
| 1,968,698 | Meyer | July 31, 1934 |
| 2,020,850 | Myhren et al. | Nov. 12, 1935 |
| 2,077,907 | Streander | Apr. 20, 1937 |
| 2,717,774 | Obma | Sept. 13, 1955 |

FOREIGN PATENTS

| 31,631 | Netherlands | Dec. 15, 1933 |
| 143,057 | Austria | Oct. 10, 1935 |
| 146,397 | Great Britain | June 9, 1921 |